Dec. 14, 1948. P. B. DRANE ET AL 2,456,493
TIME CONTROLLED VALVE
Filed Feb. 26, 1947
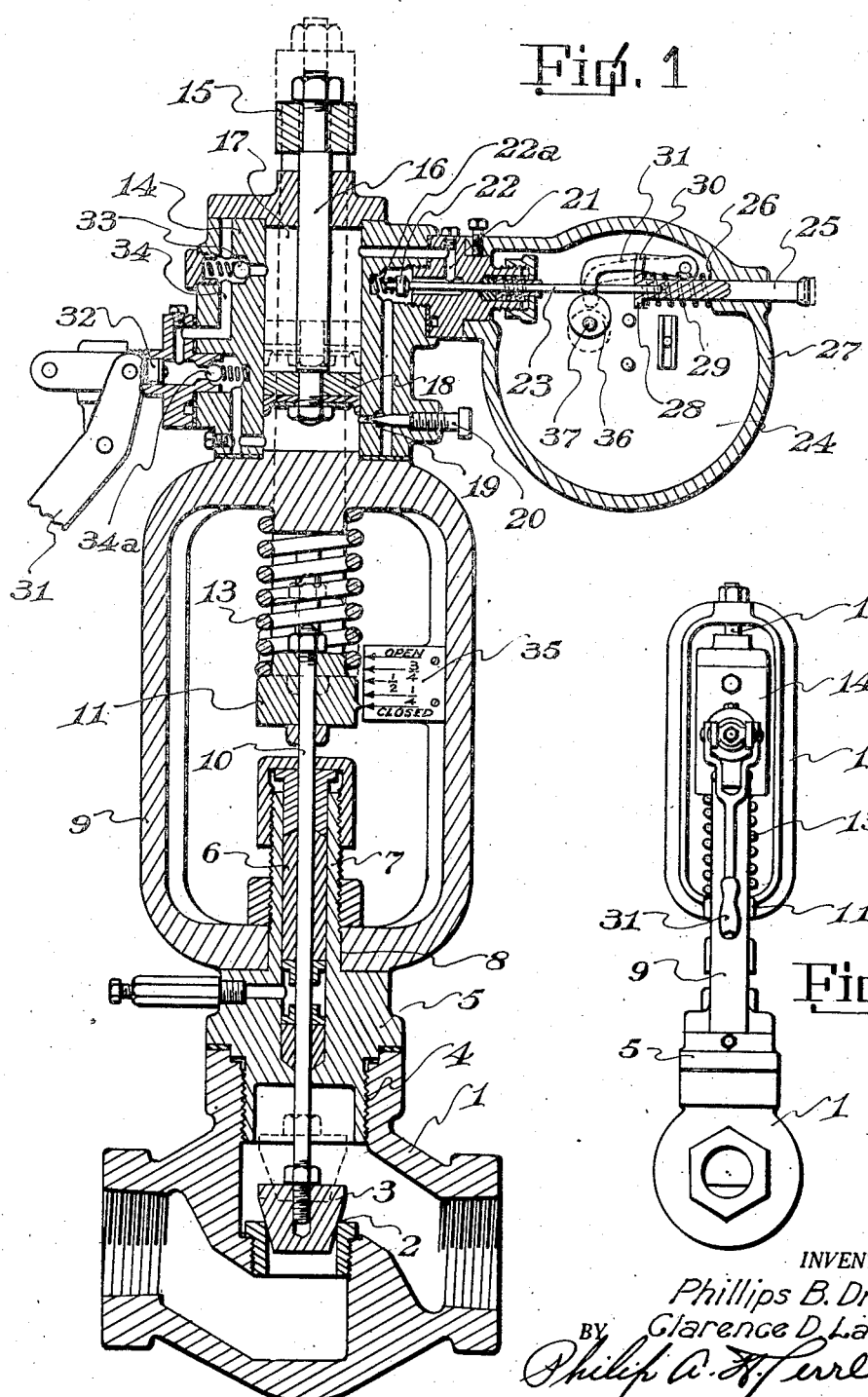
INVENTORS
Phillips B. Drane
Clarence D. Laidley
BY Philip A. H. Terrell
ATTORNEY.

Patented Dec. 14, 1948

2,456,493

UNITED STATES PATENT OFFICE 2,456,493

TIME CONTROLLED VALVE

Phillips B. Drane and Clarence D. Laidley, Tulsa, Okla.

Application February 26, 1947, Serial No. 730,938

8 Claims. (Cl. 161—7)

The invention relates to time controlled valves, and has for its object to provide a device of this kind wherein a valve is normally forced towards seated position by an expansion spring and held off-seat by a control piston actuated by a fluid transferable from below the piston to above the piston for allowing closing of the valve at a predetermined time.

A further object is to provide a pump and check valve arrangement whereby fluid may be transferred from above the piston to below the piston for opening or unseating the valve a predetermined amount, and time controlled by-pass means whereby, at a predetermined time, the fluid from below the piston will be transferred to a position above the piston for allowing the closing of the valve.

A further object is to control the release bypass port by means of a valve carried by a valve rod and normally maintained open by spring means and maintained closed by a time clock controlled trip mechanism, which is released at a predetermined time.

A further object is to mount a supporting yoke on the valve body and a second yoke at a right angle to the first mentioned yoke, and arching the upper side of the first mentioned yoke, and controlling the piston. Also to interpose an expansion spring between the adjacent ends of the yoke for normally forcing the valve to closed position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through the valve control mechanism.

Figure 2 is a side elevation of the valve controlled mechanism.

Referring to the drawing, the numeral 1 designates a conventional form of valve body having a valve seat 2 therein, with which the vertically movable valve 3 cooperates. Threaded at 4 into the upper end of the valve body is a closure plug 5 having a packing gland 6 therein. The threaded stem 7 of the member 5 extends upwardly through the opening 8 in the lower end of the supporting frame or yoke 9, and slidably mounted in the packing gland 6 is a valve rod 10. The upper end of the valve rod 10 extends through the transverse portion 11 of the upper yoke 12 and interposed between the lower end of the upper yoke 12 and the upper end of the lower yoke 9 is an expansion spring 13 which normally urges the valve 3 towards closed position, as shown in Figure 1.

Mounted on the upper end of the lower yoke 9 and within the upper yoke 12 is a cylinder block 14, which, during the operation of the device is stationary. Extending downwardly from the transverse portion 15 of the upper yoke is a piston rod 16, which rod extends into the piston chamber 17, and terminates in a piston 18. It will be noted that the expansion spring 13 normally urges the upper yoke 12 downwardly, and the piston rod and piston carried thereby, against fluid in the lower end of the piston chamber 17. When the fluid in the lower end of the chamber 17 is displaced it passes through the port 18 in velocity according to the setting of the metering pin 20. The displaced fluid passes upwardly and through the port 21 when the time controlled valve 22 is unseated and thence into the upper end of the chamber 17 above the piston 18, thereby allowing the piston to move downwardly and the valve to seat. This operation takes place upon the opening of the time controlled valve 22 at a predetermined time.

Valve 22 is carried by a valve rod 23 which extends transversely to the rear of a clock mechanism 24, and is slidably engaged to a control plunger 25. Interposed between the shoulder 26 of the clock casing 27 and the flange 28 of the plunger is an expansion spring 29 which urges the valve 22 to open position. Valve 22 is held in closed position by the spring 22a and liquid pressure. The lug 30, carried by the pivoted trip lever 31, engages over the shoulder 28 when the plunger 25 is pulled outwardly, at which time the valve 22 is closed by spring 22a, thereby preventing the by-passing of the liquid from below, to the upper side of the piston 18.

When it is desired to open the main valve 3 a hand lever 31 is oscillated, and this will reciprocate the piston 32, thereby pumping fluid past the check valve 33 through the port 34, a back check valve 34a, to the under side of the piston, that is, when the time controlled valve 22 is closed by pulling the plunger 25 outwardly. The valve 3 has been unseated to the desired position according to the scale 35 with the clock control trip cam 36 placed in the dotted line position shown in Figure 1, and as the plunger 25 has been previously pulled outwardly the lug 30 is engaged over the plunger flange 28 and the valve 22 has been allowed to close by the spring 22a. After the time clock has been set in the usual manner the valve will be held open until the predetermined time arrives, and then the alarm shaft 37, on which the cam 36 is mounted, will rotate and lift the free end of the lever 31 until its lug 30 is raised out of the path of the flange 28 of the plunger 25, and then the expansion spring 29 will unseat the time valve 22 and allow the by-passing of fluid from below the piston 18 to a position above the piston; this by-passing taking place under the expansive action of the spring 13 which will positively seat the valve 3. When it is desired to reset, the above operation is repeated.

By adjusting the metering valve 20 the closing speed of the main valve 3 can be regulated to prevent hydraulic shock to connecting apparatus when time valve closes off line flow.

From the above it will be seen that a time controlled valve is provided of the reciprocating type, which is simple in construction, positive in its operation, and one which can be applied to various line valves by simply removing the bonnets therefrom.

The invention having been set forth what is claimed as new and useful is:

1. The combination with a reciprocating valve in a valve casing, of a time controlled mechanism for said valve, said mechanism comprising an upwardly extending frame rigidly connected to the valve casing, a valve rod extending upwardly into said frame, a yoke of an endless type having its lower end arched through the frame, expansion spring means interposed between the adjacent ends of the yoke and frame for normally urging the valve to closed position, a chambered block carried by the upper end of the frame within the yoke, a piston rod extending downwardly from the yoke and into the chamber of the block, a piston carried by said piston rod and means for transferring fluid from either side of the piston in the chamber and holding the piston at various elevations and releasing and allowing the transfer of fluid from one side of the piston to the other at a predetermined time.

2. A device as set forth in claim 1 including means whereby fluid can be manually transferred from one side to the other of the piston.

3. A device as set forth in claim 1 including a by-pass port in the block around the piston and means for controlling the flow of fluid through said port.

4. A device as set forth in claim 1 including a by-pass port in the block around the piston, a time controlled valve in said port and time controlled mechanism cooperating with said valve for opening said port at a predetermined time.

5. A device as set forth in claim 1 including a by-pass port in the block around the piston, a time controlled valve in said port for opening the same at a predetermined time, a valve rod carried by said valve, means for normally forcing said valve to open position, means for latching said valve in closed position and time controlled means cooperating with the latching means for releasing the latching means and allowing the valve to open at a predetermined time.

6. A device as set forth in claim 1 including a by-pass port around the piston, a time controlled valve controlling the flow through said port and a metering valve for regulating the speed of flow of fluid through the port.

7. A device as set forth in claim 1 wherein the manual means for transferring fluid from above to below the piston comprises a by-pass port around the piston, reversely positioned check valves in said port and a pump cooperating with the fluid in the port between the check valve.

8. A device as set forth in claim 1 wherein the time controlled valve is entirely supported in the bonnet opening of the valve casing.

PHILLIPS B. DRANE.
CLARENCE D. LAIDLEY.

REFERENCES CITED

The following references are of record in the file of this patent:

UNITED STATES PATENTS

| Number | Name | Date |
| --- | --- | --- |
| 821,184 | Oakes | May 22, 1906 |
| 1,237,764 | Ely | Aug. 21, 1917 |
| 1,249,293 | Norwood | Dec. 4, 1917 |